US010353097B2

(12) United States Patent
Nguyen et al.

(10) Patent No.: US 10,353,097 B2
(45) Date of Patent: Jul. 16, 2019

(54) MULTI-Z POLYLINES INTERSECTION POINTS EDITING

(71) Applicant: LANDMARK GRAPHICS CORPORATION, Houston, TX (US)

(72) Inventors: Nam X. Nguyen, Katy, TX (US); Scott D. Senften, Sugar Land, TX (US); Mary J. Cole, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 14/758,692

(22) PCT Filed: Apr. 1, 2014

(86) PCT No.: PCT/US2014/032570
§ 371 (c)(1),
(2) Date: Jun. 30, 2015

(87) PCT Pub. No.: WO2015/152902
PCT Pub. Date: Oct. 8, 2015

(65) Prior Publication Data
US 2016/0252638 A1 Sep. 1, 2016

(51) Int. Cl.
*G01V 1/34* (2006.01)
*G06T 17/05* (2011.01)
*G06T 15/40* (2011.01)

(52) U.S. Cl.
CPC .............. *G01V 1/34* (2013.01); *G06T 15/405* (2013.01); *G06T 17/05* (2013.01); *G01V 1/345* (2013.01); *G06T 2210/21* (2013.01)

(58) Field of Classification Search
CPC .......... G01V 1/34; G01V 1/345; G06T 17/05; G06T 2210/21; G06T 15/405
See application file for complete search history.

(56) References Cited

U.S. PATENT DOCUMENTS 7,098,908 B2   8/2006   Acosta et al.
7,283,911 B2   10/2007  Fitzsimmons et al.
(Continued)

FOREIGN PATENT DOCUMENTS

EP          2031423         5/2013

OTHER PUBLICATIONS

Herkommer et al. Minimizing Misties in Seismic Data, Computers & Geosciences, vol. 20, No. 5 (1994), pp. 767-795.*
(Continued)

*Primary Examiner* — Janet L Suglo
*Assistant Examiner* — Liam R Casey
(74) *Attorney, Agent, or Firm* — Locke Lord LLP

(57) ABSTRACT

Method and system for 3-D imaging of subterranean geologic structures based on seismic data interpretations involves correcting mis-ties that arise as a result of orthogonal polylines failing to intersect due to inconsistencies in seismic interpretations. In some embodiments, the mis-ties may be corrected by adding a data point from one polyline at or near the mis-tie to the other polyline, and vice versa for the other polyline. The two data points are then adjusted so they coincide or merge. The merged data point is then used as intersection points for the polylines and associated with one another such that a change made to one intersection point is automatically made to the other intersection point. In some embodiments, one or more neighboring data points on each polyline are adjusted to smooth out the polyline at the point of the corrected mis-tie.

3 Claims, 13 Drawing Sheets

(56) References Cited

U.S. PATENT DOCUMENTS

| | | | |
|---|---|---|---|
| 2003/0055568 A1* | 3/2003 | Zauderer | G01V 1/28 702/14 |
| 2004/0263509 A1* | 12/2004 | Serra | G06F 3/04845 345/419 |
| 2010/0185396 A1* | 7/2010 | Docherty | G01V 1/28 702/18 |
| 2010/0225642 A1 | 9/2010 | Murray et al. | |
| 2013/0055149 A1 | 2/2013 | Murray et al. | |

OTHER PUBLICATIONS

ET Spatial Techniques, Polyline Edit Tools Dialog, Aug. 19, 2002 [retrieved on Aug. 8, 2016]. Retrieved from the Internet: <URL:https://web.archive.org/web/20020819210511/http://www.ian-ko.com/et/ETUserGuide/polyline_edit_tools_dialog.htm>.*

Bishop et al., Correcting Amplitude, Time, and Phase Mis-Ties in Seismic Data, 1993, Society of Exploration Geophysicists, 1993 SEG Annual Meeting, Sep. 26-30 Washington, DC, pp. 1103-1105 (Year: 1993).*

Kim, PCT Search Report for PCT Application No. PCT/US2014/032570 dated Dec. 15, 2014.

Kim, PCT Written Opinion for PCT Application No. PCT/US2014/032570 dated Dec. 15, 2014.

Canadian Office Action for Canadian Application No. 2941145 dated Jun. 19, 2017, pp. 1-4.

Canadian Office Action for Canadian No. 2,941,145 dated May 1, 2018.

* cited by examiner

MULTI-Z POLYLINES INTERSECTION POINTS EDITING

FIELD OF THE INVENTION

The exemplary embodiments disclosed herein relate generally to techniques for 3-D imaging and modeling of subterranean geologic structures using seismic data acquired from seismic reflection surveys taken of the subterranean formations, and particularly to a computer-implemented method, system, and computer program product for interpreting multi-Z polylines representing complex multi-Z geological structures like deepwater salt bodies.

BACKGROUND OF THE INVENTION

Seismic reflection surveys can reveal many structural details about a subterranean formation, including the location of subterranean faults, mineral deposits, and the like. It is desirable to accurately image and model the location and extent of these geologic structures owing to their importance in a number of commercial applications. For example, in hydrocarbon exploration, it is important to accurately model salt bodies and similar structures because such salt bodies are known to trap significant amounts of oil and gas in the formation underneath.

A common and widely used method of generating 3-D images of a salt body from seismic reflection surveys is to define the salt boundaries using horizons or height fields. Typically, an upward-facing or top horizon and a downward-facing or bottom horizon are defined for the salt body, then the salt structure between the top and bottom horizons is filled in by performing a flood fill. The data representing the horizons is usually stored and processed by imaging software using a 2-D array or grid where the elements in the grid represent points on the surface of the salt body in the horizontal direction (i.e., X and Y axes), and the value contained in each element indicates the depth (i.e., Z axis) of the salt boundary at that point.

However, constructing an accurate and realistic model of a salt body is inherently difficult because the nature of salt makes the seismic data noisy and poorly defined. In most cases, geologists and geophysicists must interpret the volumes of seismic data using their geological knowledge and experience to manually define the edge of the salt body as intersected by an individual vertical plane (section) and horizontal plane (slice). These seismic interpretations typically contain data points that were deemed by the geologists and geophysicists as most indicative of the boundary of the salt body. The data points are then input into imaging software, which connects the points together to form a set of polylines that outline the contour of the salt body. The imaging software then fills in the area between the polylines using the 2-D array or grid to render a 3-D image of the salt body.

Because salt bodies are closed structures, the polylines almost always encircle the salt body and are therefore almost always closed-ended. This means virtually every element in the 2-D array or grid for the image of a salt body will have at least two values in Z, with some elements having as many as four or more Z values, depending on the shape of the salt body. In addition, using polylines to describe the salt body can lead to inconsistencies ("mis-ties") at the point where two polylines are intended to intersect. Additionally, editing any one polyline can introduce even more mis-ties to other polylines. These mis-ties typically cause the rendering of the salt body to breakdown. Furthermore, in order to correct a mis-tie, editing has to be performed on both polylines, which can be very time consuming.

A need therefore exists for improved techniques to overcome the deficiencies in using polylines to describe the salt bodies by automatically eliminating the mis-tie that may occurs at the intersection of the polylines.

BRIEF DESCRIPTION OF THE DRAWINGS

The foregoing and other advantages of the exemplary disclosed embodiments will become apparent upon reading the following detailed description and upon reference to the drawings, wherein.

DETAILED DESCRIPTION OF THE DISCLOSED EMBODIMENTS

Figure 1:
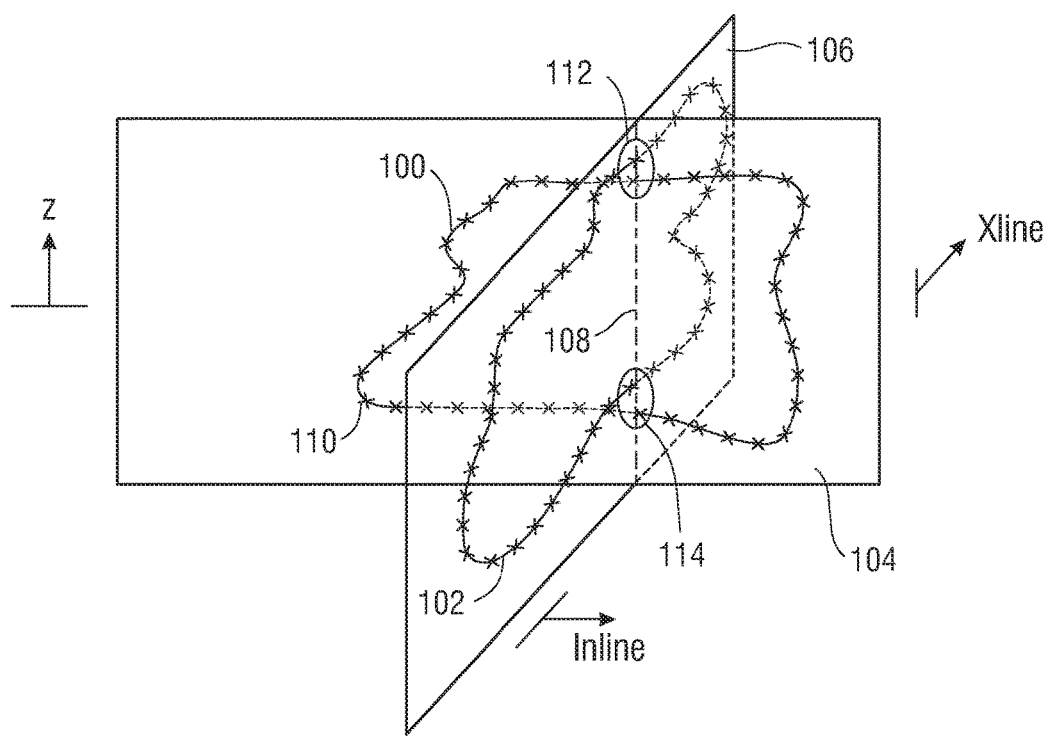
FIG. 1 is an example of two multi-Z polylines having mis-ties according to the exemplary disclosed embodiments.

As an initial matter, it will be appreciated that the development of an actual, real commercial application incorporating aspects of the exemplary disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, the nature of salt makes seismic data noisy and poorly defined and therefore errors and inconsistencies may arise when geologists and geophysicists attempt to describe a salt body using polylines. For example, interpretations of the seismic data may produce two orthogonal polylines that should, but do not intersect each other, leading to a nonsensical result in the real world. Drawing tools such as DecisionSpace® Geoshapers from Landmark Graphics Corporation and the like may be used to correct the mis-ties, but the corrections are difficult and time-consuming to make because the mis-ties, by definition, have no intersection points with which they may be referenced. Moreover, editing a polyline, whether to correct a mis-tie or make other changes, may inadvertently create another mis-tie with the same or a different polyline because, again, there is no intersection point with which the mis-tie may be referenced. It should be noted that although the description and the figures herein often focus on imaging salt bodies, those having ordinary skill in the art will understand that the principles and teachings disclosed are equally applicable to imaging other types of geologic structures.

The exemplary embodiments disclosed herein relate to an improved way to correct such mis-ties. In general operation, the exemplary embodiments correct the mis-ties by identifying on the affected polylines the sample or data points closest to the mis-ties, adjusting the sample or data points so they coincide or merge, setting the merged data points as intersection points in the affected polylines, and associating the intersection points of the affected polylines with one another. These embodiments may be implemented on a standalone basis, or they may be incorporated into an existing application, such as a 3-D imaging application for modeling subterranean geologic structures. For example, the exemplary embodiments may be implemented as part of a 3-D imaging application for converting multi-Z polylines into single-Z segments to produce single-Z horizons or height fields for the geologic structures. The presence of intersection points on the polylines is important because the intersection points allow the polylines to be modified and otherwise manipulated (e.g., edited, moved, changed, etc.) in the 3-D imaging application in a different way from other points on the polylines. It should be noted that although the following detailed description and the figures focus primarily on imaging salt bodies, the principles and teachings disclosed herein may also be applied to imaging other types of geologic structures by those having ordinary skill in the art.

Turning now to FIG. 1, an example of polylines for a subterranean salt body is shown that are produced from data points or sample points manually selected by geologists and geophysicists. It is of course possible for the polylines to be produced using automatically selected sample points without departing from the scope of the disclosed embodiments, as the particular way in which the sample points are selected is not critical to the practice of embodiments. As can be seen, the polylines are multi-Z polylines, meaning every point in the polylines will have at least two values in Z. Only two multi-Z polylines 100 and 102 are shown here for clarity and economy of the description, whereas a typical 3-D salt body image may include several dozen multi-Z polylines or more.

Of the two multi-Z polylines, the first polyline 100 lies in an xline plane 104 while the second polyline 102 lies in an inline plane 106. The xline plane 104 and the inline plane 106 are orthogonal to one another and intersect each other along the dashed line indicated at 108. Depth is indicated by the Z indicator. Along each polyline 100 and 102 are a plurality of small crosses resembling x's, one of which is indicated at 110, that represent data points or sample points manually selected by the geologists and geophysicists. The two polylines 100 and 102 are intended to intersect each other at the two circled areas labeled 112 and 114 along the dashed line 108, but due to errors and inconsistencies in seismic interpretations, the polylines 100 and 102 do not actually intersect in this example, resulting in mis-ties in the indicated areas.

In accordance with the exemplary disclosed embodiments, the mis-ties may be corrected by adding a new data point to each polyline 100 and 102 at or near (e.g., a nearest point within a defined search radius) the intended intersection to "tie" the two polylines together. The new data points may then be merged or otherwise adjusted so they coincide with one another. The merged data points may then be set as intersection points on each polyline 100 and 102, respectively. These intersection points may then be associated with one another to tie the polylines 100 and 102 together. The foregoing process may be repeated for any additional mis-ties as needed. Thereafter, if one intersection point is edited (e.g., moved, changed, etc.), the intersection points associated with the edited intersection point on every polyline are updated in a coordinated manner. One or more neighboring data points around the intersection point may also be updated in some embodiments according to the influence of the edited intersection point. Such influence may be based, for example, on the distance from the neighboring data points to the edited intersection point, and the like. Such an arrangement helps avoid mis-ties, build relationships between polylines that more fully describe the desired geologic structure, prevent mis-ties from being introduced during editing, eliminate manually readjusting data points beyond the desired intersection point, and improve overall efficiency of the polyline editing process.

Figure 2:
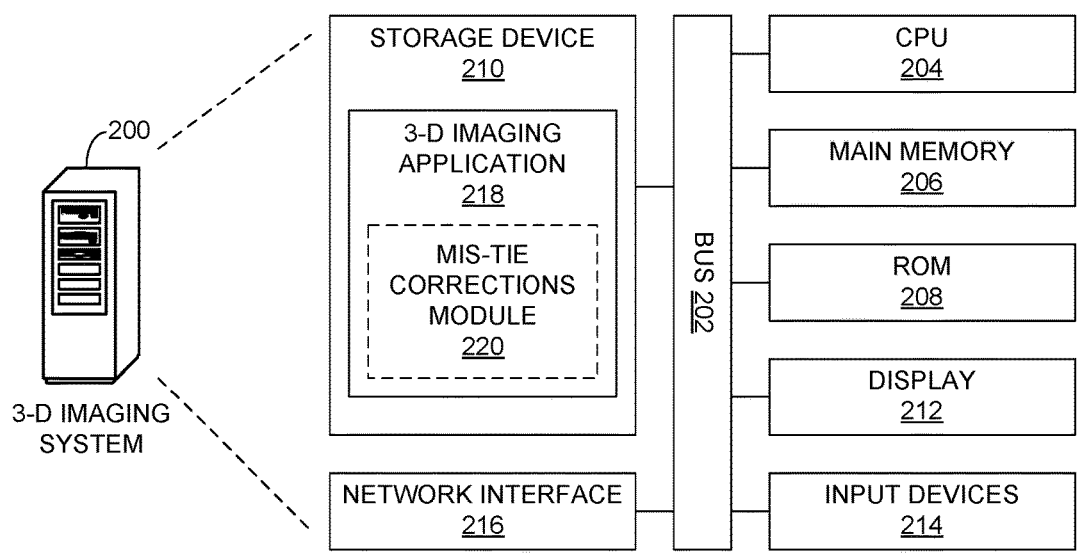
FIG. 2 is an example of a system that may be used to correct mis-ties according to the exemplary disclosed embodiments.

FIG. 2 is an example of a imaging system 200 that may be used to correct mis-ties according to the exemplary disclosed embodiments. As seen in FIG. 2, the exemplary system 200 is a 3-D imaging system capable of modeling and rendering 3-D images of subterranean geologic structures. Such a 3-D imaging system 200 may be a conventional workstation, desktop, or laptop computer, or it may be a custom computing system developed for a particular application. In a typical arrangement, the system 200 includes a bus 202 or other communication pathway for transferring information within the 3-D imaging system 200, and a CPU 204 coupled with the bus 202 for processing the information. The 3-D imaging system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions to be executed by the CPU 204.

The 3-D imaging system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more data input units 214, including alphanumeric and other keyboards, mouse, trackball, cursor direction keys, and so forth, may be coupled to the bus 202 for communicating information and command selections to the CPU 204. A network or communications interface 216 may be provided for allowing the 3-D imaging system 200 to receive or input data and otherwise communicate with an external device, system, or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

A 3-D imaging application 218, or rather the computer-readable instructions therefor, may also reside on or be downloaded to the storage device 210. In general, the 3-D imaging application 218 is a computer program that can receive or input a plurality of data points reflecting seismic interpretations and render a 3-D image of a geologic structure, such as a salt body, based on those data points. Examples of commercially available 3-D imaging applications may include DecisionSpace® Geophysics from Landmark Graphics Corporation. The 3-D imaging application 218 may be executed by the CPU 204 and/or other components of the 3-D imaging system 200 to generate a model or image of the geologic structure. Such a 3-D imaging application 218 may be written in any suitable computer programming language known to those having ordinary skill in the art using any suitable software development environment known to those having ordinary skill in the art. Examples of suitable programming languages may include C, C++, C#, FORTRAN, MATLAB (from The MathWorks, Inc.), and LabVIEW (from National Instruments, Inc.), and the like. Examples of suitable software development environments include Visual Studio from Microsoft Corporation, and the like.

In accordance with the exemplary disclosed embodiments, the 3-D imaging application 218 may include among its other features and capabilities a mis-tie corrections module 220. As the name suggests, the mis-tie corrections module 220 is capable of correcting mis-ties that may arise as a result of errors and inconsistencies in seismic interpretation. The mis-tie corrections module 220 may operate on a standalone basis, or it may be used in conjunction with other features and capabilities of the 3-D imaging application 218. Similarly, the mis-tie corrections module 220 may operate to correct mis-ties in closed polylines such as those shown in FIG. 1, or it may be used with open polylines, or a hybrid representation that includes both.

Figure 3:
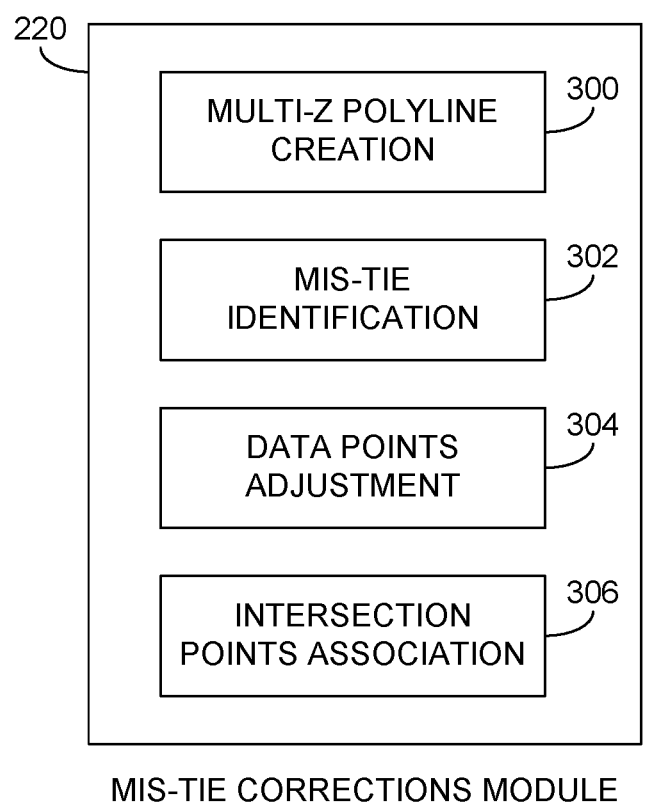
FIG. 3 is an example of an application that may be used to correct mis-ties according to the exemplary disclosed embodiments.

FIG. 3 illustrates the mis-tie corrections module 220 in more detail according to the embodiments disclosed herein. As can be seen, the mis-tie corrections module 220 is composed of several functional components that, in some embodiments, may be software components, hardware components, or a combination of software and hardware components. In the example shown here, the functional components include a multi-Z polyline creation component 300, a mis-tie deification component 302, a data points adjustment component 304, and an intersection point association component 306. It should be noted that although a number of discrete components are shown here, those having ordinary skill in the art will understand that one or more of these functional components be divided into several constituent components, or two or more components may be combined into a single component, without departing from the scope of the exemplary disclosed embodiments. General operation of the functional components 300-306 is described below with conjunction with FIG. 4 via a flowchart 400.

Figure 4:
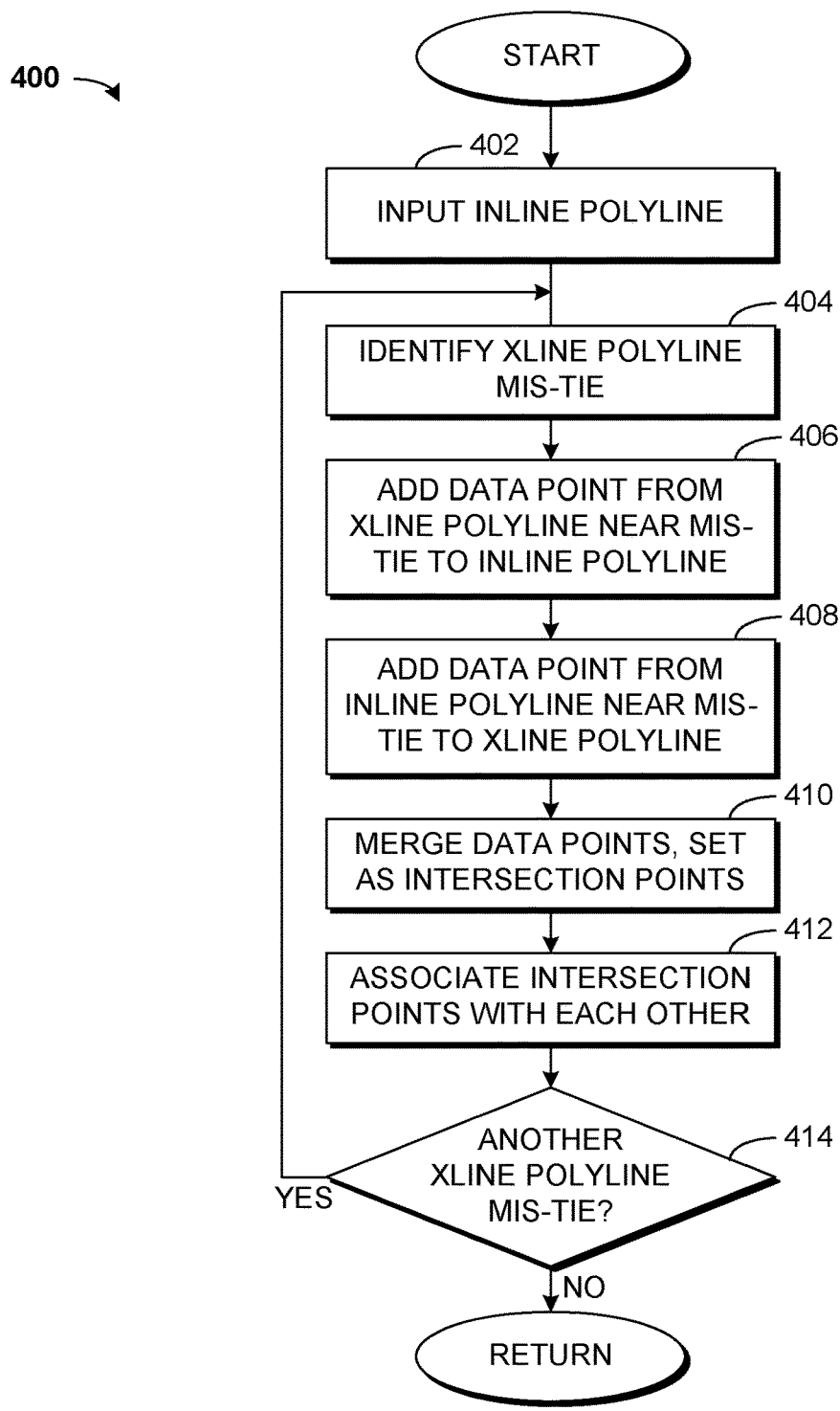
FIG. 4 is an exemplary flowchart that may be used to correct mis-ties according to the exemplary disclosed embodiments.

As can be seen in FIG. 4, the mis-tie corrections module 220 generally begins at block 402, where an inline polyline is received or otherwise inputted by the mis-tie corrections module. At block 404, a mis-tie is identified for an xline polyline that is supposed to intersect the inline polyline. At block 406, a data point from the xline polyline at or near (e.g., a nearest point within a defined search radius) the mis-tie is added to the inline polyline. In a similar manner, at block 408, a data point from the inline polyline at or near (e.g., a nearest point within a defined search radius) the mis-tie is added to the xline polyline. At block 410, the two added data points are merged so that they coincide with each other, and the resulting data point is used as an intersection point for the two polylines. At block 412, the two intersection points are associated with each other such that if one of the intersection points is changed, the other intersection point is automatically adjusted to reflect the same change. A determination is thereafter made at block 414 whether there are any additional mis-ties for the xline polyline. If the determination is yes, then the mis-tie correction described above is repeated for the additional mis-ties.

Figure 5:
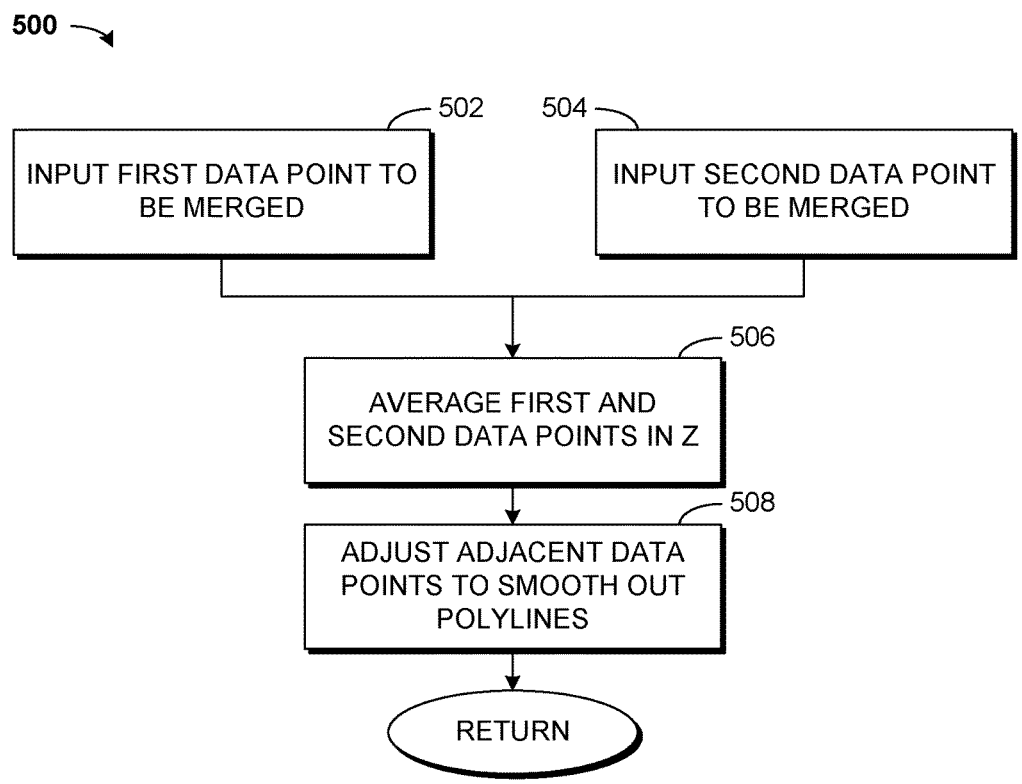
FIG. 5 is an exemplary flowchart that may be used for merging mis-ties according to the exemplary disclosed embodiments.

FIG. 5 illustrates an example of the merging shown in block 410 via a flowchart 500. In general, merging may be performed using any known method of merging two data points, including averaging, interpolating, curve fitting, regression analysis, convergence, and the like, without departing from the scope of the disclosed embodiments. As can be seen in FIG. 5, merging begins at block 502, where the first data point to be merged (e.g., from the xline polyline) is received or otherwise inputted. At block 504, the second data point to be merged (e.g., from the inline polyline) is similarly received or otherwise inputted. At block 506, the value in Z of the two data points are averaged, and the resulting average value is used as the value in Z for both data points. The merged data point is then used as intersection points for the two polylines in any subsequent processing as needed. Finally, as an optional step, at block 508, one or more of the neighboring data points around the intersection points in each polyline (i.e., the data points before and after the intersection point) may be adjusted in an appropriate manner to smooth out the polyline around the intersection point so the polyline does not appear sharp, jagged, or spiky in that area. Such smoothing may be accomplished, for example, using spline smoothing to soften the surrounding area.

Mis-tie correction may also be performed in a manner similar to the above for any mis-tie corrections that may be needed for a Z polyline intersecting the inline polyline. Moreover, the mis-tie corrections may be performed for existing polylines that were already defined, or the corrections may be performed while in the process of creating a new polyline. In the latter case, a geologist or geophysicist would be able to define and edit the intersection points in near real time while he/she is interpreting seismic data to create a new polyline. This allows the geologist or geophysicist to adjust the intersection points to existing polylines as needed so there will be no mis-ties that need to be corrected afterward.

Figure 6:
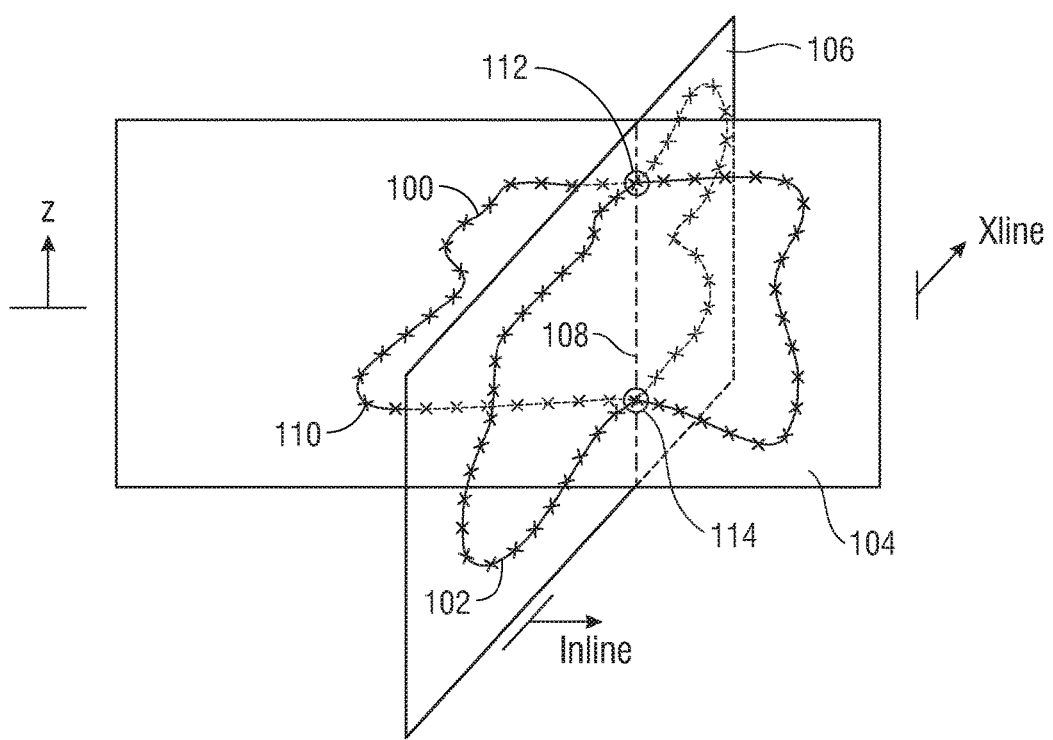
FIG. 6 is an example of two multi-Z polylines having mis-ties that have been corrected according to the exemplary disclosed embodiments.

FIG. 6 shows the mis-ties of FIG. 1 after mis-tie correction has been performed in accordance with the exemplary disclosed embodiments. As can be seen, the mis-ties previously shown in FIG. 1 in the circles labeled as 112 and 114 have now been corrected such that the polylines 100 and 102 now intersects one another in the indicated areas. The intersection points shown within the circles 112 and 114 may now be used to modify and/or manipulate (e.g., edited, moved, changed, etc.) the polylines 100 and 102 as needed without having to modify and/or manipulate each individual polyline separately.

An example of a corrected mis-tie is provided in Tables 1-4 below, which provide a rudimentary illustration of the 2-D arrays or grids for a given polyline. In Table 1, Polyline A has a value in Z of 8 at point X=1 and Y=3, while in Table 2, Polyline B has a value in Z of 4 at point X=1 and Y=3. Clearly there is a mis-tie here, as the same X and Y in the two polylines would have the same value in Z in the real world. After the mis-tie is corrected in accordance with the exemplary disclosed embodiments, point X=1 and Y=3 in Polyline A and Polyline B, respectively, now have the same value in Z, namely, 6 (the average of 8 and 4), as can be seen in Tables 3 and 4.

TABLE 1

Polyline A (before mis-tie correction)

| X | Y | Z |
|---|---|---|
| ... | ... | ... |
| 1 | 3 | 8 |
| ... | ... | ... |

TABLE 2

Polyline B (before mis-tie correction)

| X | Y | Z |
|---|---|---|
| ... | ... | ... |
| 1 | 3 | 4 |
| ... | ... | ... |

TABLE 3

Polyline A (after mis-tie correction)

| X | Y | Z | Link |
|---|---|---|------|
| ... | ... | ... | ... |
| 1 | 3 | 6 | Polyline B |
| ... | ... | ... | ... |

TABLE 4

Polyline B (after mis-tie correction)

| X | Y | Z | Link |
|---|---|---|------|
| ... | ... | ... | ... |
| 1 | 3 | 6 | Polyline A |
| ... | ... | ... | ... |

Moreover, as can be seen in Table 3, point X=1 and Y=3 for Polyline A has now been set as the intersection point and has been associated or linked with the same point in Polyline B. Likewise, as shown in Table 7, intersection point X=1 and Y=3 for Polyline B has now been set as the intersection point and has been associated or linked with the same point in Polyline A. Thereafter, any changes to either polyline at the respective intersection point will be automatically reflected in the other polyline at the respective intersection point. This allows the intersection point for one polyline to be easily edited, moved, or otherwise changed without having to track or account for the intersection point in the other polyline.

As mentioned above, the exemplary mis-tie correction embodiments disclosed herein may be implemented on a standalone basis or as part of a 3-D imaging application that is capable of converting multi-Z polylines into single-Z segments. These multi-Z polylines are extremely computationally intensive and difficult for imaging software to render. The difficulty is compounded when there are mis-ties as well in the multi-Z polylines. Thus, in some embodiments, the 3-D imaging application may be used to convert the multi-Z polylines into single-Z segments and as well as correct any mis-ties in conjunction with the single-Z conversion.

Figure 7:
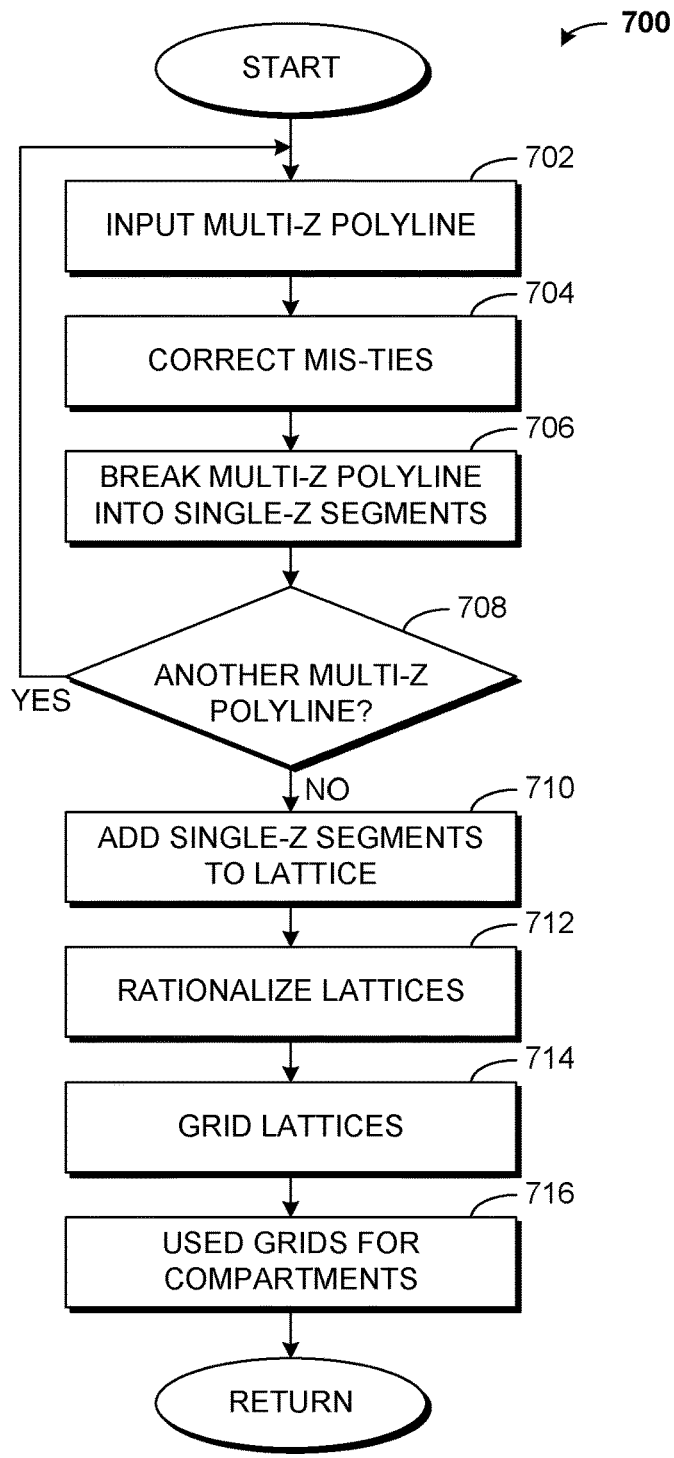
FIG. 7 is an exemplary flowchart that may be used for converting multi-Z polylines to single-Z line segments according to the exemplary disclosed embodiments.

FIG. 7 illustrates the general operation of the 3-D imaging application with respect to the single-Z conversion. As can be seen, single-Z conversion begins by receiving a multi-Z polyline reflecting a set of seismic interpretations at block 702. At block 704, the 3-D imaging application may be used to perform mis-tie correction in the manner described above. At block 706, the 3-D imaging application breaks, divides, or otherwise reduces the multi-Z polyline into a plurality of contiguous single-Z line segments. Specifically, the 3-D imaging application identifies sections or segments along the multi-Z polyline such that no point along an individual segment has more than one value in Z. This identification process continues until the entire multi-Z polyline has been converted to single-Z line segments. The 3-D imaging application also assigns every single-Z line segments a unique identifier that allows it to be referenced as needed. The unique identifiers for the single-Z line segments may be any suitable identifier, such as an integer value, a numeric or alphanumeric sequence reflecting the relationship between the single-Z line segments and the multi-Z polyline, and the like.

Once the multi-Z polyline has been reduced to single-Z line segments, the 3-D imaging application determines at block 708 whether there are additional multi-Z polylines that need to be converted. If the determination is yes, then the above process is repeated for the additional multi-Z polylines. If the determination is no, then the 3-D imaging application groups or otherwise assembles the single-Z line segments into one or more lattices at block 710, as explained in more detail herein. At block 712, the lattices are rationalized or broken up as needed to ensure that no lattice folds back upon itself or overlaps itself. Thereafter, the rationalized lattices are gridded at block 714 and used to form compartments at block 716 in a manner well known to those having ordinary skill in the art.

Figure 8:
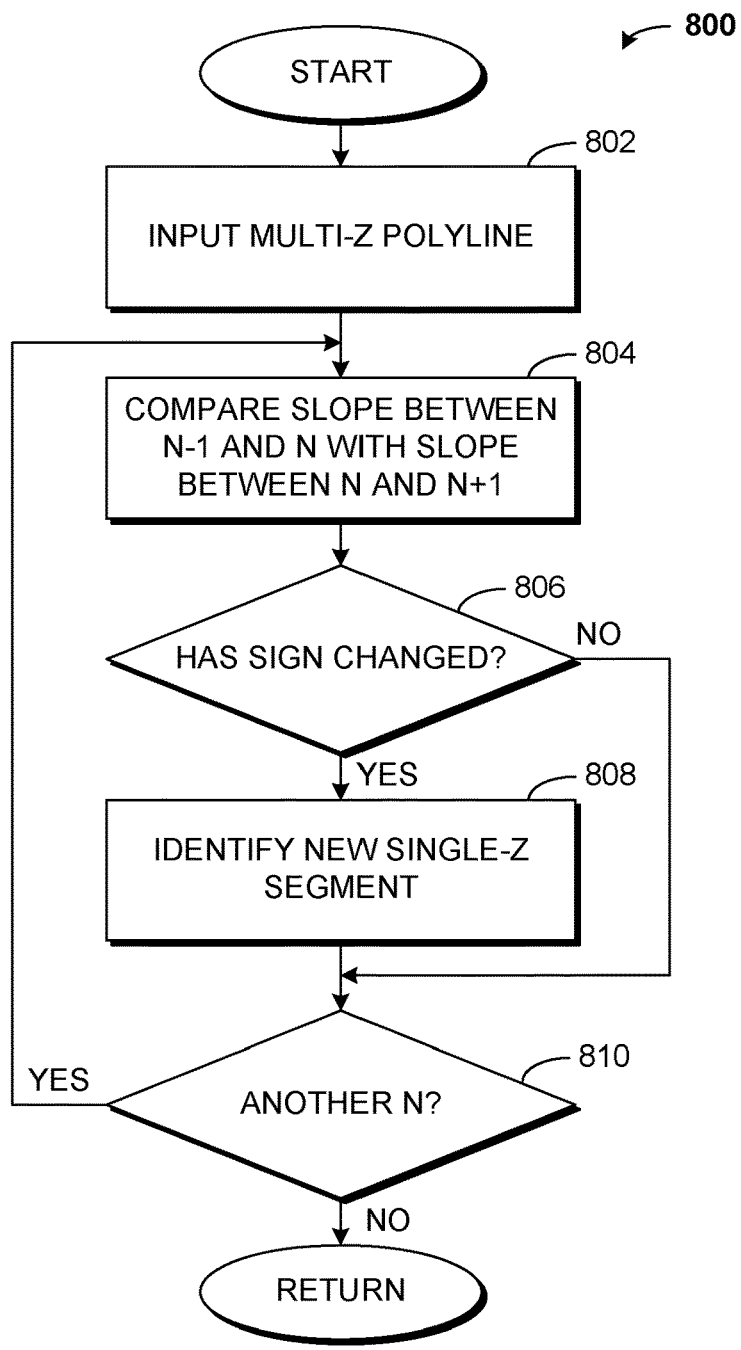
FIG. 8 is an exemplary flowchart that may be used for identifying single-Z line segments according to the exemplary disclosed embodiments.

FIG. 8 shows an exemplary flowchart 800 of the steps that the 3-D imaging application may use for the single-Z line segment identification block 706 (see FIG. 7). In general, the identification of single-Z line segments begins with receiving a multi-Z polyline at block 802. At block 804, the slope or average slope of a line segment along the multi-Z polyline between a given sample point N−1 and the next sample point N is determined, and a comparison is made between that slope and the slope or average slope of a line segment between sample point N and sample point N+1. A determination is made at block 806 whether the comparison of the slope or average slope of the two line segments resulted in a sign change from positive to negative or vice versa, which would indicate the multi-Z polyline is starting to bend back around. If the determination at block 806 is yes, then a new single-Z line segment is identified at block 808 starting from sample point N. If the determination at block 806 is no, then the line segment starting from sample point N is simply added to the existing contiguous line segment and no new single-Z line segment is identified. This process ensures no line segment has a slope that changes sign from positive to negative or vice versa, and therefore no point along the line segment has more than one value in Z. Thereafter, at block 810, a determination is made as to whether there are additional sample points for which a slope comparison is needed. The above process then either continues or terminates based on the outcome of this determination.

In addition to identifying new single-Z line segments, the 3-D imaging application may also use the slope change comparisons of block 808 to identify whether the single-Z line segments belong in the top or bottom horizon. In some embodiments, the single-Z conversion may perform the top or bottom horizon determination by traversing the multi-Z polyline in a clockwise direction according to the orientation of the polyline. Then, a sign change in the slope between successive line segments not only indicates the start of a new single-Z line segment, but also indicates the horizon for the new single-Z line segment. Specifically, a sign change from positive to negative indicates the new single-Z line segment belongs in the bottom horizon, whereas a sign change from negative to positive indicates the new single-Z line segment belongs in the top horizon.

Figures 9A, 9B:
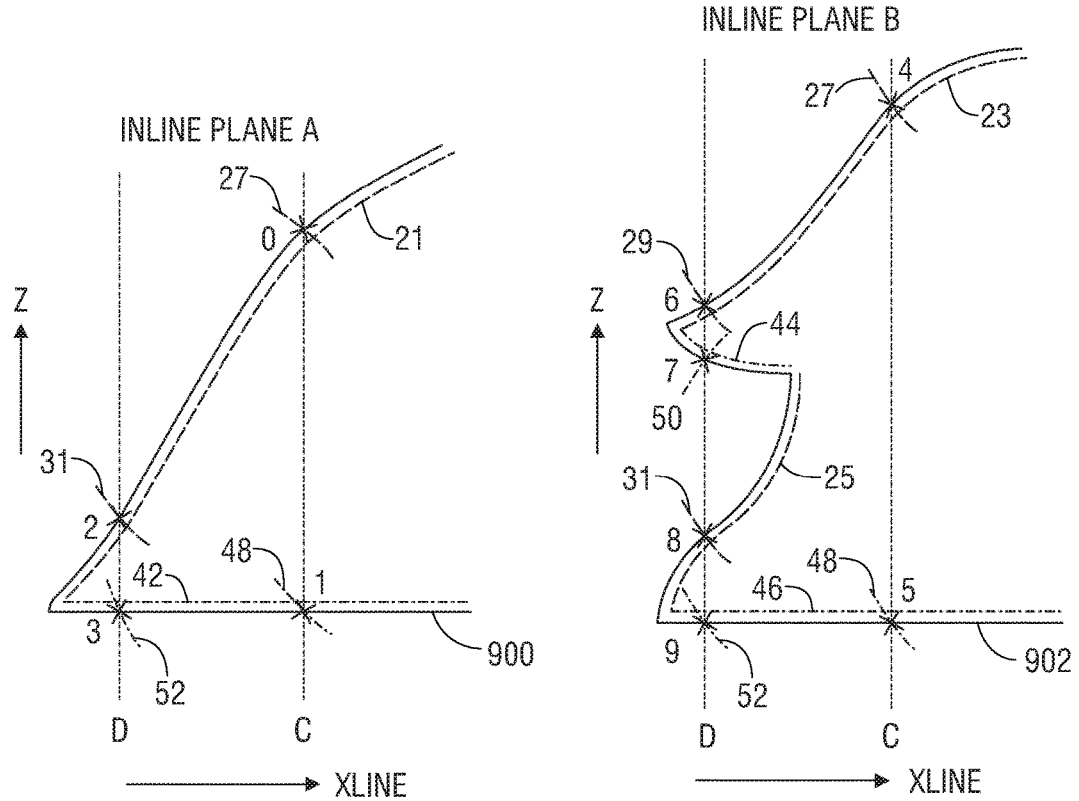
FIGS. 9A-9D are exemplary multi-Z polylines and corresponding single-Z line segments according to the exemplary disclosed embodiments.
Figure 9C:
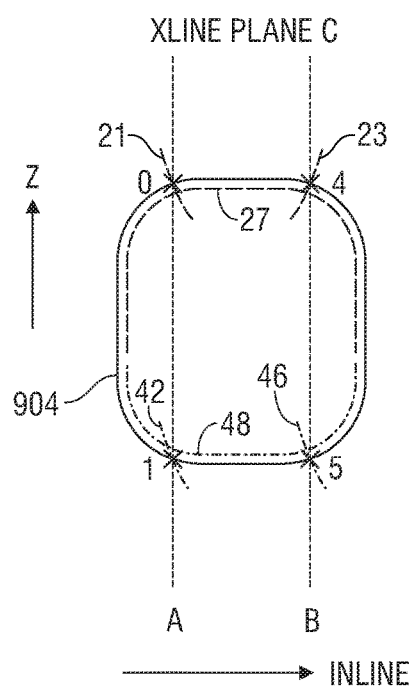
Figure 9D:
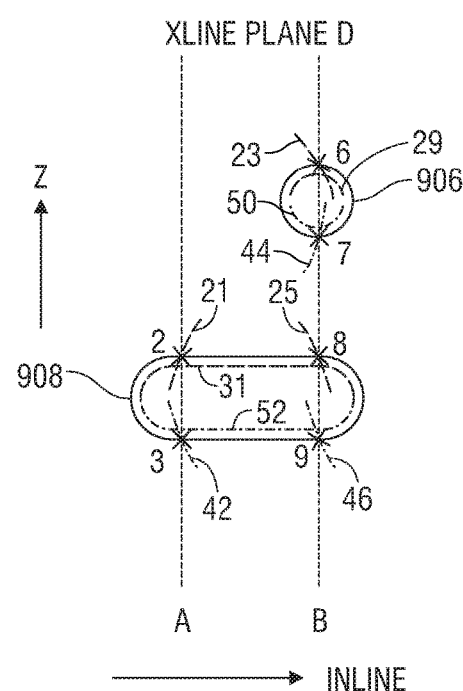

FIGS. 9A-9D illustrate examples of multi-Z polylines and their corresponding single-Z line segments that may be identified by the 3-D imaging application according to the exemplary embodiments disclosed herein. Referring first to FIGS. 9A and 9B, inline planes labeled A and B are shown, respectively, that are parallel to one another and to the surface of the page. FIGS. 9C and 9D show xline planes labeled C and D, respectively, that are parallel to one another and to the surface of the page, but orthogonal to the inline planes A and B. The relative orientations may be seen in FIGS. 9A and 9B where the xline planes C and D are designated with short-dash lines labeled C and D, respectively, and likewise in FIGS. 9C and 9D where the inline planes A and B are designated with short-dash lines labeled A and B, respectively.

Referring still to FIGS. 9A-9D, solid lines within the various planes represent multi-Z polylines similar to those commonly rendered in a typical workflow based on seismic interpretations. The long dash lines and the dash-dot lines represent single-Z line segments corresponding to the multi-Z polylines identified according to the exemplary disclosed embodiments. In particular, the long dash lines represent single-Z line segments that reside in one of the height fields, for example, the top horizon, whereas the dash-dot lines represent single-Z line segments that reside in the other height field, for example, the bottom horizon. Here, the small crosses resembling x's represent points where the various inline and xline multi-Z polylines intersect one another.

Turning now to FIG. 9A, a portion of an inline multi-Z polyline is shown, as represented by the solid line 900. This portion of the inline multi-Z polyline 900 may be reduced by the 3-D imaging application in the manner described above to a top horizon single-Z line segment 21 and a bottom horizon single-Z line segment 42. At least four xline multi-Z polylines intersect the inline multi-Z polyline 900 at intersection points 0, 1, 2, and 3. These four xline multi-Z polylines may also be reduced in the manner described above to a top horizon single-Z line segment 27 that crosses intersection point 0, a bottom horizon single-Z line segment 48 that crosses intersection point 1, another top horizon single-Z line segment 31 that crosses intersection point 2, and another bottom horizon single-Z line segment 52 that crosses intersection point 3.

The intersection points 0 and 1 from FIG. 9A may also be seen in FIG. 9C, along with the xline single-Z line segments 27 and 48 extending through these intersection points. Looking at FIG. 9C, it can be seen that the single-Z line segments 27 and 48 from FIG. 9A actually correspond to an xline multi-Z polyline 904. To avoid clutter, this xline multi-Z polyline 904 is not specifically depicted in FIG. 9A, which instead shows the corresponding single-Z line segments 27 and 48 for clarity. FIG. 9C also shows the inline single-Z line segments 21 and 42 from FIG. 9A extending through the intersection points 0 and 1.

The other intersection points from FIG. 9A, points 2 and 3, may also be seen in FIG. D, along with the xline single-Z line segments 31 and 52 extending through them. These single-Z line segments 31 and 52 correspond to xline multi-Z polyline 908. Again, to avoid clutter, this xline multi-Z polyline 908 is not specifically depicted in FIG. 9A, which shows the single-Z line segments 31 and 52 instead for clarity.

The remaining inline and xline multi-Z polylines in FIGS. 9A-9D, their corresponding inline and xline single-Z line segments, as well as the various intersection points, may be cross referenced to one another in the same fashion as above. For example, FIG. 9B shows a portion of an inline multi-Z polyline 902, two top horizon single-Z line segments 23 and 25 resulting therefrom, two bottom horizon single-Z line segments 44 and 46 resulting therefrom, and six intersection points 4, 5, 6, 7, 8, and 9 that are intersected, respectively, by six single-Z line segments 27, 48, 29, 50, 31, and 52. All of these intersection points and the inline single-Z line segments extending through them may also be seen and cross referenced in FIGS. 9C and 9D.

Similarly, FIG. 9C shows an xline multi-Z polyline 904, a top horizon single-Z line segment 27 resulting therefrom, a bottom horizon single-Z line segment 48 resulting therefrom, and four intersection points 0, 1, 4, and 5 that are intersected, respectively, by four inline single-Z line segments 21, 42, 23, and 46. All of these intersection points and the single-Z line segments extending through them may also be seen and cross referenced in FIGS. 9A and 9B.

Finally, FIG. 9D shows two xline multi-Z polylines 906 and 908, two xline single-Z line segments 29 and 50 resulting from the first polyline 906, and two xline single-Z line segments 31 and 52 resulting from the second polyline 908. As well, there are two intersection points 6 and 7 along the first polyline 906 that are intersected, respectively, by the inline single-Z line segments 23 and 44, and four intersection points 2, 3, 8, and 9 along the second polyline 908 that are intersected, respectively, by the inline single-Z line segments 21, 42, 25, and 46. All of these intersection points and the single-Z line segments extending through them may also be seen and cross referenced in FIGS. 9A and 9B.

A simplistic example to illustrate the 3-D imaging application concepts discussed above is provided below in Tables 5, 6 and 7. In this example, the tables are rough facsimiles of a portion of the 2-D arrays or grids of a given multi-Z polyline for a geologic structure. Referring to Table 5, there are two values in Z at point X=1 and Y=3 of the polyline, namely, Z=4 and 24. Tables 6 and 7 are the top and bottom horizon single-Z line segments, respectively, corresponding to the polyline after it has been converted according to the exemplary embodiments disclosed herein. As can be seen in Tables 6 and 7, there is now only one value in Z for each line segment at point X=1 and Y=3.

TABLE 5

Multi-Z Polyline

| X | Y | Z |
|---|---|---|
| ... | ... | ... |
| 1 | 3 | 4, 24 |
| ... | ... | ... |

TABLE 6

Top Horizon Single-Z Segment

| X | Y | Z |
|---|---|---|
| ... | ... | ... |
| 1 | 3 | 4 |
| ... | ... | ... |

TABLE 7

Bottom Horizon Single-Z Segment

| X | Y | Z |
|---|---|---|
| ... | ... | ... |
| 1 | 3 | 24 |
| ... | ... | ... |

Figure 10:
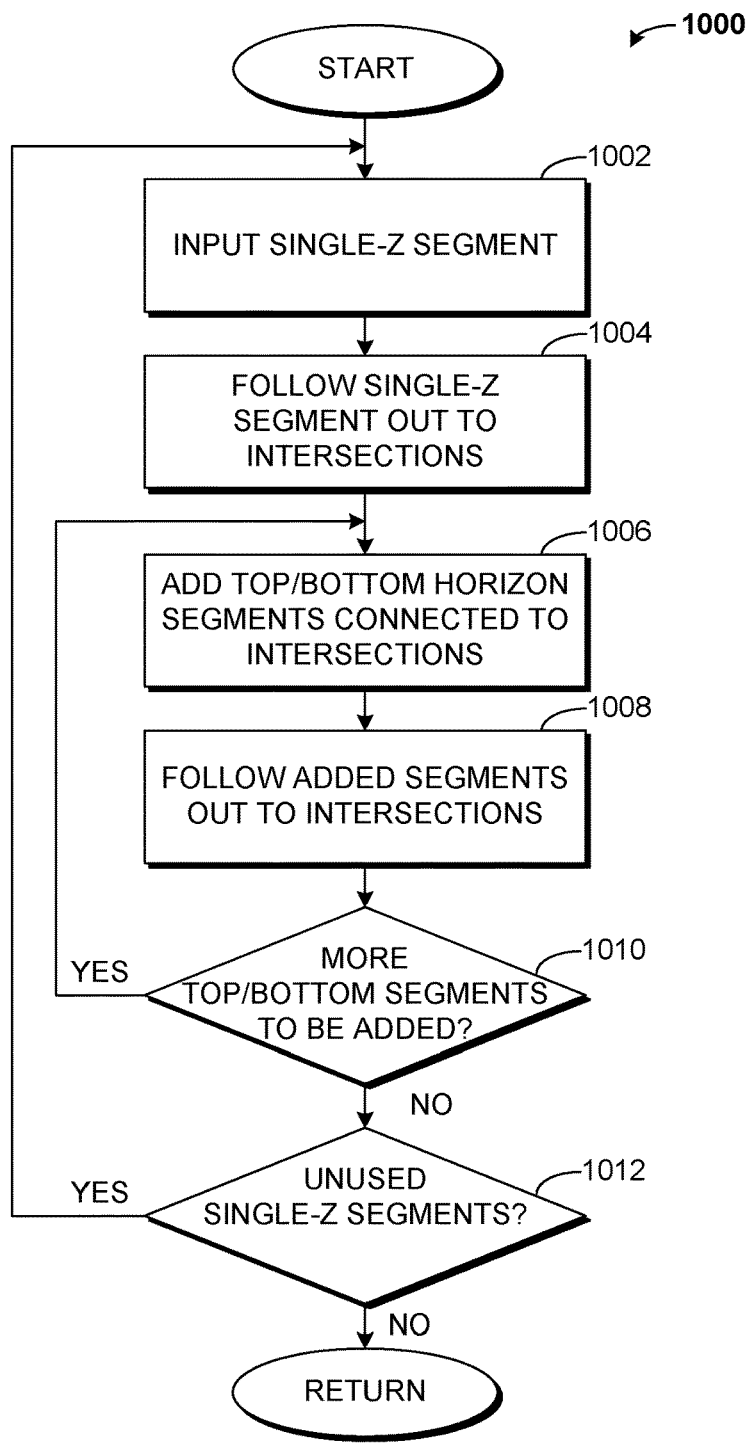
FIG. 10 is an exemplary flowchart that may be used for adding single-Z line segments to a lattice according to the exemplary disclosed embodiments.

Once the single-Z line segments have been identified for the various multi-Z polylines, the 3-D imaging application may assemble or otherwise group the line segments together to form lattices, as depicted in block 710 (see FIG. 7). An example of creating a lattice is shown in FIG. 10 in the form of a flowchart 1000. In general, lattice creation starts with receiving or inputting a single-Z line segment for a given multi-Z polyline at block 1002. Next, based on whether the received single-Z line segment is a top horizon line segment (long dash) or a bottom horizon line segment (dash-dot), additional top or additional bottom horizon line segments may be added to the lattice. In particular, the received single-Z line segment is traced or followed out to its intersection points at block 1004, and any top or bottom horizon single-Z line segments crossing through or connected to the intersection points are added accordingly at block 1006. At block 1008, the newly added single-Z line segments are traced or followed out to their respective intersection points. A determination is then made at block 1010 whether there are any additional top or additional bottom horizon single-Z line segments that need to be added to the lattice. If the determination is yes, then the previous adding steps at blocks 1006 and 1008 are repeated, and the process continues in a recursive manner until all intersection points branching off from the initial single-Z line segment have been walked, and all top or bottom single-Z line segments connected to those intersection points have been added to the lattice accordingly.

If the determination at block 1010 is no, then a determination is made at block 1012 whether any unused single-Z line segments, that is, any single-Z line segments that have not been added to a lattice, remain. If the determination is yes, then the process returns to block 1002 and a new lattice is started from the unused single-Z line segment. If the determination is no, then the process is terminated.

Figure 11A:
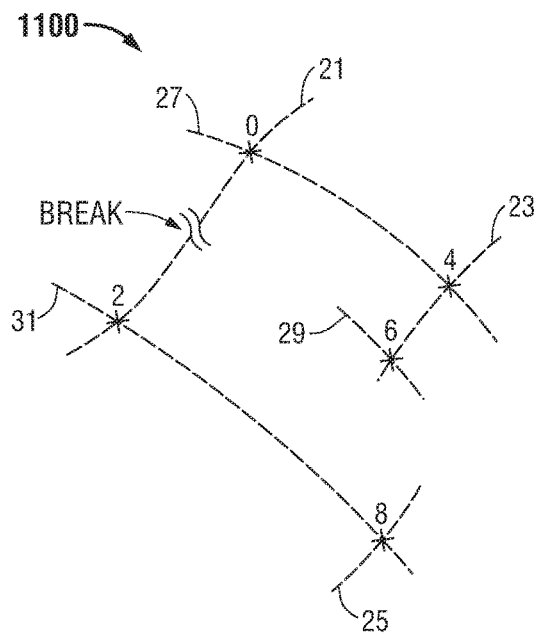
FIGS. 11A-11C are exemplary lattices composed of single-Z line segments according to the exemplary disclosed embodiments.
Figure 11B:
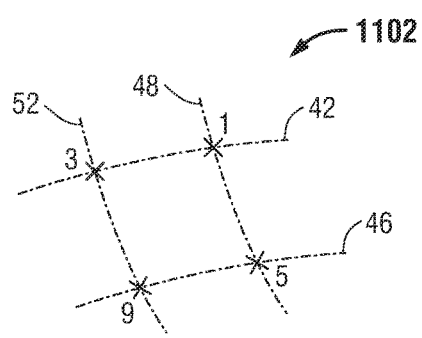
Figure 11C:
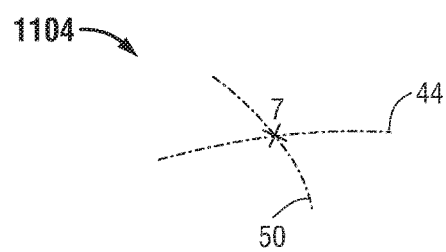

FIGS. 11A-11C illustrate examples of single-Z line segments grouped together by the 3-D imaging application to form lattices according to the exemplary embodiments discussed above. In the example of FIG. 11A, a top horizon lattice 1100 is shown having five of the intersection points 0, 2, 4, 6, and 8 initially discussed with respect to FIGS. 9A-9D. These intersection points are connected to each other by the single-Z line segments 21, 23, 25, 27, 29, and 31, to form the lattice 1100 as shown. In a similar manner, FIG. 11B shows a lattice 1102 having four intersection points 1, 3, 5, and 9 that are connected to one another by the bottom horizon single-Z line segments 42, 46, 48, and 52. FIG. 11C shows a lattice 1104 having one intersection point 7 and two bottom horizon single-Z line segments 44 and 50.

Figure 12:
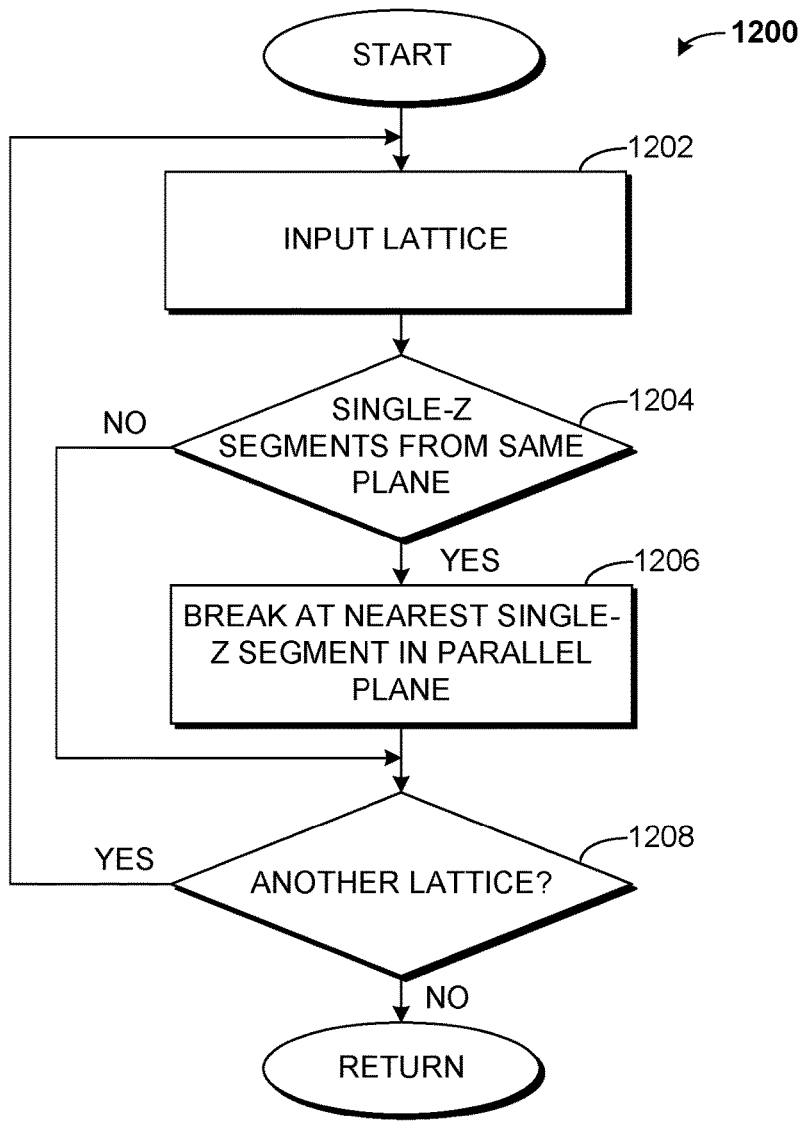
FIG. 12 is an exemplary flowchart that may be used for rationalizing single-Z lattices according to the exemplary disclosed embodiments.

Due to the way the 3-D imaging application constructs the lattices in some embodiments, it may be possible for a lattice to fold back over itself and overlap itself. One option for preventing this overlapping is to rationalize or break up the lattices so that no lattice contains single-Z line segments that lie in the same inline or xline plane, as discussed with respect to block 712 (see FIG. 7). FIG. 12 shows an example of the 3-D imaging application rationalizing a lattice in accordance with the exemplary disclosed embodiments. In general, referring to the flowchart 1200 in FIG. 12 rationalization begins with receiving an inline or xline lattice at block 1202. At block 1204, a determination is made whether any of the single-Z line segments in the lattice share the same plane. If the determination is yes, then at block 1206, the lattice is broken at whichever single-Z line segment is: 1) nearest to the single-Z line segments sharing a plane, and 2) in a plane parallel to the shared plane.

If the determination at block 1204 is no, then a determination is made at block 1208 whether any additional lattices need to be rationalized. If yes, then the process returns to block 1202 for additional lattice rationalization. If no, then the process terminates.

Turning back to FIG. 11A, the top horizon lattice 1100 shown here is an example of a lattice that has been rationalized by the 3-D imaging application. As depicted, the top horizon lattice 1100 includes two single-Z line segments 23 and 25 that share the same plane, namely, inline plane B (see FIG. 9B). In accordance with the exemplary disclosed embodiments, the 3-D imaging application has determined the single-Z line segment 21 to be the nearest line segment that also resides in a plane parallel to the single-Z line segments 23 and 25 (see FIG. 9A). The single-Z line segments 27, 29, and 31, on the other hand, reside in different xline planes C and D (see FIGS. 9C and 9D). Therefore, the 3-D imaging application has broken the top horizon lattice 1100 at the single-Z line segment 21 such that the single-Z line segments 23 and 25 no longer have a continuous, unbroken path between them via the single-Z line segment 21. This may be achieved in the example of FIG. 11A by breaking the single-Z line segment 21 between the intersection points 0 and 2.

In contrast, the 3-D imaging application does not need to break up the bottom horizon lattice 1102 in FIG. 11B because none of its single-Z line segments 42, 46, 48, or 52 share the same plane. This may be verified by reference to FIGS. 9A-9D, which shows each of the single-Z line segments 42, 46, 48, and 52 residing in different planes from one another. Likewise, the bottom horizon lattice 1104 in FIG. 11C also does not need to be broken up, as none of its single-Z line segments 44 and 50 share the same plane (see FIGS. 9B and 9D).

Thus, as set forth above, the embodiments disclosed herein may be implemented in a number of ways. In general, in one aspect, the exemplary disclosed embodiments relate to a computer-based imaging system for imaging a geologic structure in a subterranean formation. The system comprises, among other things, a central processing unit mounted within the computer-based imaging system, a display electrically connected to the central processing unit and displaying a three-dimensional (3-D) image of the geologic structure, and a data input unit electrically connected to the central processing unit, the data input unit receiving seismic interpretations for the geologic structure, the seismic interpretations comprising interpretations of data acquired from a seismic reflection survey taken of the subterranean formation. The system further comprises a storage device electrically connected to the central processing unit, the storage device storing an imaging application executable by the central processing unit to render the seismic interpretations as multi-Z polylines, each multi-Z polyline defining a different contour of the geologic structure within a given plane and having a plurality of intersection points where the multi-Z polyline intersects other multi-Z polylines, at least one multi-Z polyline having a mis-tie resulting from the multi-Z polyline missing an expected intersection with at least one other multi-Z polyline. The storage device further stores a mis-tie corrections module executable by the central processing unit to tie the multi-Z polyline to the other multi-Z polyline near the expected intersection, the central processing unit executing the mis-tie corrections module either after the multi-Z polyline has been defined or while the Z polyline is being defined.

In general, in another aspect, the exemplary disclosed embodiments relate to a computer-based method of imaging a geologic structure in a subterranean formation. The method comprises, among other steps, receiving seismic interpretations for the geologic structure through a data input unit, the seismic interpretations comprising interpretations of data acquired from a seismic reflection survey taken of the subterranean formation. The method additionally comprises rendering the seismic interpretations as multi-Z polylines using a central processing unit, each multi-Z polyline defining a different contour of the geologic structure within a given plane and having a plurality of intersection points where the multi-Z polyline intersects other multi-Z polylines, at least one multi-Z polyline having a mis-tie resulting from the multi-Z polyline missing an expected intersection with at least one other multi-Z polyline. The method further comprises tying the multi-Z polyline to the other multi-Z polyline near the expected intersection to correct the mis-tie using the central processing unit, wherein the multi-Z polyline is tied to the other multi-Z polyline either after the multi-Z polyline has been defined or while the Z polyline is being defined.

In general, in yet another aspect, the exemplary disclosed embodiments relate to a computer-readable medium storing computer-readable instructions for causing a computer to image a geologic structure in a subterranean formation. The computer-readable instructions comprise instructions for causing the computer to, among other things, receive seismic interpretations for the geologic structure, the seismic interpretations comprising interpretations of data acquired from a seismic reflection survey taken of the subterranean formation. The computer-readable instructions additionally comprise instructions for causing the computer to render the seismic interpretations as multi-Z polylines, each multi-Z polyline defining a different contour of the geologic structure within a given plane and having a plurality of intersection points where the multi-Z polyline intersects other multi-Z polylines, at least one multi-Z polyline having a mis-tie resulting from the multi-Z polyline missing an expected intersection with at least one other multi-Z polyline. The computer-readable instructions further comprise instructions for causing the computer to tie the multi-Z polyline to the other multi-Z polyline near the expected intersection to correct the mis-tie, wherein the multi-Z polyline is tied to the other multi-Z polyline either after the multi-Z polyline has been defined or while the Z polyline is being defined.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the exemplary disclosed embodiments as defined in the appended claims.

What is claimed is:

1. A computer-based imaging system for graphically correcting imaging of a salt body having a closed structure in a subterranean formation displayed on a display, comprising:
 a central processing unit mounted within the computer-based imaging system;
 a display electrically connected to the central processing unit and displaying a three-dimensional (3-D) image of the salt body;
 a data input unit electrically connected to the central processing unit, the data input unit receiving seismic interpretations for the salt body, the seismic interpretations comprising interpretations of data acquired from a seismic reflection survey taken of the subterranean formation; and
 a storage device electrically connected to the central processing unit, the storage device storing therein an imaging application executable by the central processing unit to render the seismic interpretations as multi-Z polylines on the display, each multi-Z polyline displayed on the display representing a different contour of the salt body within a given plane, and each polyline displayed on the display having a plurality of intersection points displayed on the display where the multi-Z polyline intersects other multi-Z polylines displayed on the display, at least one multi-Z polyline displayed on the display having a mis-tie resulting from the multi-Z polyline missing an expected intersection with at least one other multi-Z polyline displayed on the display;
 wherein the storage device further stores therein a mis-tie corrections module executable by the central processing unit to tie the multi-Z polyline to the at least one other multi-Z polyline near the expected intersection displayed on the display, the mis-tie corrections module causing the central processing unit to:
tie the multi-Z polyline to the other multi-Z polyline displayed on the display by adding on the display a data point from the multi-Z polyline near the mis-tie to the at least one other multi-Z polyline and adding on the display a data point from the at least one other multi-Z polyline near the mis-tie to the multi-Z polyline;
merge on the display the data points added to the multi-Z polyline and the at least one other multi-Z polyline so that the data points coincide;
store the merged data point in the storage device as corrected intersection points for the multi-Z polyline and the at least one other multi-Z polyline;
link the corrected intersection points with each other in the storage device for the multi-Z polyline and the at least one other multi-Z polyline, respectively, such that a change in one corrected intersection point is automatically made in the other corrected intersection points;
automatically adjust on the display neighboring data points to the intersection points to smooth out on the display the multi-Z polyline and the at least one other multi-Z polyline near the mis-tie; and
display the 3-D image of the salt body using multi-Z polylines with the corrected intersection points and adjusted neighboring data points on the display.

2. A computer-based method of graphically correcting imaging of a salt body having a closed structure in a subterranean formation displayed on a display, comprising:
receiving seismic interpretations for the salt body through a data input unit, the seismic interpretations comprising interpretations of data acquired from a seismic reflection survey taken of the subterranean formation; and
rendering the seismic interpretations as multi-Z polylines on the display using a central processing unit, each multi-Z polyline displayed on a display representing a different contour of the salt body within a given plane, and each polyline having a plurality of intersection points displayed on the display where the multi-Z polyline intersects other multi-Z polylines displayed on the display, at least one multi-Z polyline having a mis-tie resulting from the multi-Z polyline missing an expected intersection with at least one other multi-Z polyline displayed on the display; and
tying the multi-Z polyline to the at least one other multi-Z polyline displayed on the display near the expected intersection to graphically correct the mis-tie displayed on the display using the central processing unit, wherein tying the multi-Z polyline to the at least one other multi-Z polyline comprises;
adding on the display a data point from the multi-Z polyline near the mis-tie to the at least one other multi-Z polyline and adding on the display a data point from the at least one other multi-Z polyline near the mis-tie to the multi-Z polyline;
merging on the display the data points added to the multi-Z polyline and the at least one other multi-Z polyline so that the data points coincide;
storing the merged data point in a storage device as corrected intersection points for the multi-Z polyline and the at least one other multi-Z polyline;
linking the corrected intersection points with each other in the storage device for the multi-Z polyline and the at least one other multi-Z polyline, respectively, such that a change in one corrected intersection point is automatically reflected in the other corrected intersection points;
automatically adjusting on the display neighboring data points to the intersection points to smooth out on the display the multi-Z polyline and the at least one other multi-Z polyline near the mis-tie; and
displaying a 3-D image of the salt body on a display using multi-Z polylines with the corrected intersection points and adjusted neighboring data points.

3. A non-transitory computer-readable medium storing computer-readable instructions for causing a computer to graphically correct an image of a salt body having a closed structure in a subterranean formation displayed on a display, the computer-readable instructions comprising instructions for causing the computer to:
receive seismic interpretations for the salt body, the seismic interpretations comprising interpretations of data acquired from a seismic reflection survey taken of the subterranean formation; and
render the seismic interpretations as multi-Z polylines displayed on the display, each multi-Z polyline displayed on the display representing a different contour of the salt body within a given plane, and each polyline having a plurality of intersection points on the display where the multi-Z polyline intersects other multi-Z polylines displayed on the display, at least one multi-Z polyline having a mis-tie resulting from the multi-Z polyline missing an expected intersection with at least one other multi-Z polyline displayed on the display; and
tie the multi-Z polyline to the at least one other multi-Z polyline on the display near the expected intersection to graphically correct the mis-tie displayed on the display, wherein the computer-readable instructions cause the computer to tie the multi-Z polyline to the at least one other multi-Z polyline displayed on the display by;
adding on the display a data point from the multi-Z polyline near the mis-tie to the at least one other multi-Z polyline and adding on the display a data point from the at least one other multi-Z polyline near the mis-tie to the multi-Z polyline;
merging on the display the data points added to the multi-Z polyline and the at least one other multi-Z polyline so that the data points coincide;
storing the merged data point in a storage device as corrected intersection points for the multi-Z polyline and the at least one other multi-Z polyline;
linking the corrected intersection points with each other in the storage device for the multi-Z polyline and the at least one other multi-Z polyline, respectively, such that a change in one corrected intersection point is automatically reflected in the other corrected intersection points;
automatically adjusting on the display neighboring data points to the intersection points to smooth out on the display the multi-Z polyline and the at least one other multi-Z polyline near the mis-tie; and
displaying a 3-D image of the salt body on a display using multi-Z polylines with the corrected intersection points and adjusted neighboring data points.

* * * * *